United States Patent Office 3,141,881
Patented July 21, 1964

3,141,881
N-(1,3-DIHYDROXY-2-PROPYL)-MORPHOLONES
Leon Katz, Springfield, N.J., assignor to General Aniline & Film Corporation, New York, N.Y., a corporation of Delaware
No Drawing. Filed Sept. 27, 1962, Ser. No. 226,747
4 Claims. (Cl. 260—247.7)

This invention relates to N-(1,3-dihydroxy-2-propyl)-morpholones as a new class of chemical compounds having new and useful properties.

It is known that when β-propiolactone or gamma-butyrolactone and the like is heated with an organic primary amine, including hydroxy-substituted amines such as diisopropanol amine at a temperature ranging from 30–180° C., various N-substituted-amino carboxylic acid amides and/or N-substituted aminocarboxylic acids, and complex mixtures are obtained.

I have discovered that when a 6-membered dioxanone is heated with 2-amino-1,3-propanediol, N-(1,3-dihydroxy-2-propyl)-morpholones are obtained in very high yields characterized by the following general formula:

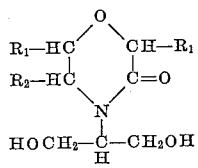

wherein $R_1$ and $R_2$ represent either hydrogen or a methyl group.

Accordingly, the principal object of the present invention is to provide compounds characterized by the foregoing formula.

Other objects and advantages will become more clearly manifest from the following description:

I have discovered that the foregoing dihydroxypropyl morpholones are readily attained in excellent yields by the condensation of either a substituted or unsubstituted dioxanone with 2-amino-1,3-propanediol with an excess of the dioxanone to give the necessary fluidity to the reaction mixture. In lieu of the excess of any of the dioxanones subsequently listed, a high boiling solvent, i.e., boiling above 200° C. such as nitrobenzene, trichlorobenzene and the like may be employed. In either case, the condensation reaction is carried out under reflux for a period of time ranging from 3 to 15 hours. Thereafter, the resulting product is isolated by vacuum distillation.

The dihydroxy-propyl morpholones have displayed many new and unexpected commercial uses. For example, polyester fibers may be modified by the incorporation of these new compounds thereby introducing readily dyeable sites into the fiber. In this connection, it is well recognized in the art that existing polyester fibers are extremely difficult to dye, and as a consequence, special methods and dyestuffs are required to suitably dye these fibers. Moreover, the dihydroxy-propyl morpholones of the present invention can also be introduced into polyurethane foams, epoxy resins or into other synthetic polymers where a dihydroxy compound is presently used. They are particularly adaptable for the preparation of surfactants by the condensation with 2 to 50 moles of ethylene oxide, propylene oxide or a mixture of such oxides.

As examples of substituted and unsubstituted dioxanones which are condensed with 2-amino-1,3-propanediol, the following are illustrative:

2-p-dioxanone
6-methyl-2-p-dioxanone
3,5-dimethyl-2-p-dioxanone

The 2-p-dioxanone is a well known organic compound. The 6-methyl and the 3-5-dimethyl derivatives are prepared in accordance with Examples IV and II respectively of U.S. Patent 2,807,629.

Illustrative of the method of preparing the foregoing dihydroxy-propyl morpholones are the following examples. All parts given are by weight.

Example I 31.5 parts of 2-p-dioxanone and 39.7 parts of 2-amino-1,3-propane diol were heated to slow reflux. An additional 15 parts of 2-p-dioxanone were added and the mixture held at reflux for 3½ hours. The resulting reaction mixture was then vacuum distilled and the product isolated at a distillation temperature of 205–212° C. at 3–4 mm. pressure. The yield of N-(1,3-dihydroxy-2-propyl)-morpholone-2 was 29.5 grams which amounts to about 43%.

Example II

Example I was repeated with the exception that the 2-p-dioxanone was replaced by 35.8 grams of 6-methyl-2-dioxanone. The product, N-(1,3-dihydroxy-2-propyl)-6-methyl morpholone-2, was isolated by vacuum distillation.

Example III 40.0 grams of 3,5-dimethyl-2-p-dioxanone was substituted for the 2-p-dioxanone in Example I. The product, N-(1,3-dihydroxy-2-propyl)-3,5-dimethyl-morpholone-2, was isolated by vacuum distillation.

While the foregoing examples have been directed to the conversion of 6-membered dioxanones into N-(1,3-dihydroxy-2-propyl) morpholones, I have also discovered that glycolide, isoxazole, α-pyrone, gamma-pyrone, 2,6-dimethyl-gamma-pyrone; 2,4-dimethyl-oxazole, coumarin, furan, tetrahydro-furan, benzofuran and 2,3-dihydropyran are also capable of such conversion to yield a new and useful class of compounds.

This application is a continuation-in-part of application Serial No. 21,905, filed on April 13, 1960, now abandoned.

I claim:

1. A compound having the following formula:

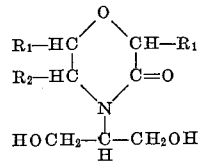

wherein $R_1$ and $R_2$ represent a member selected from the class consisting of hydrogen and methyl.

2. A compound having the following formula:
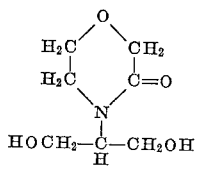
3. A compound having the following formula:
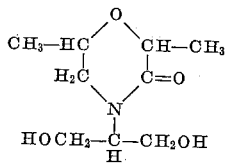
4. A compound having the following formula:
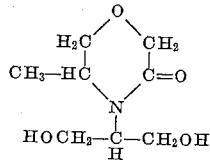
References Cited in the file of this patent
UNITED STATES PATENTS
| | | |
|---|---|---|
| 2,891,058 | Walles et al. | June 16, 1959 |
| 2,971,024 | Zaugg et al. | Feb. 7, 1961 |
| 2,987,509 | Burgert | June 6, 1961 |
OTHER REFERENCES
Yahama et al.: Chemical Abstracts, vol. 52: page 13802d (1958).